United States Patent
Amin et al.

(10) Patent No.: US 8,895,836 B2
(45) Date of Patent: Nov. 25, 2014

(54) DUAL AXIS SOLAR TRACKER APPARATUS AND METHOD

(75) Inventors: Nowshad Amin, Riyadh (SA); Mohammad Rezaul Karim, Riyadh (SA); Mamdooh S. Al-Saud, Riyadh (SA); Abdulrahman M. Al-Ahmari, Riyadh (SA)

(73) Assignee: King Saud University, Riyadh (SA)

( * ) Notice: Subject to any disclaimer, the term of this patent is extended or adjusted under 35 U.S.C. 154(b) by 490 days.

(21) Appl. No.: 13/277,153

(22) Filed: Oct. 19, 2011

(65) Prior Publication Data
US 2013/0098425 A1    Apr. 25, 2013

(51) Int. Cl.
*H01L 31/045* (2006.01)
*H01L 31/052* (2014.01)
*G01S 3/786* (2006.01)
*H01L 31/042* (2014.01)
*F24J 2/54* (2006.01)

(52) U.S. Cl.
CPC .......... *H01L 31/0422* (2013.01); *G01S 3/7861* (2013.01); *Y02E 10/47* (2013.01); *F24J 2/5424* (2013.01); *Y02E 10/50* (2013.01)
USPC ......................................... 136/246; 136/245

(58) Field of Classification Search
CPC .................................................. H01L 31/0422
See application file for complete search history.

(56) References Cited

U.S. PATENT DOCUMENTS

| | | | |
|---|---|---|---|
| 4,063,543 A | 12/1977 | Hedger | |
| 4,190,766 A | 2/1980 | Young | |
| 4,245,153 A | 1/1981 | Porter | |
| 7,202,457 B2 | 4/2007 | Janus et al. | |
| 2007/0215199 A1* | 9/2007 | Dold et al. | 136/246 |
| 2010/0095955 A1 | 4/2010 | Carrasco Martinez | |
| 2010/0276570 A1 | 11/2010 | Moser | |
| 2011/0073161 A1 | 3/2011 | Scanlon | |
| 2011/0245989 A1* | 10/2011 | Makhota et al. | 700/297 |
| 2012/0122059 A1* | 5/2012 | Schweikardt et al. | 434/118 |

FOREIGN PATENT DOCUMENTS

| | | |
|---|---|---|
| WO | WO9211496 A1 | 7/1992 |
| WO | WO2010085592 A2 | 7/2010 |
| WO | WO2010149140 A1 | 12/2010 |

* cited by examiner

*Primary Examiner* — Jayne Mershon
(74) *Attorney, Agent, or Firm* — Richard C. Litman (57) ABSTRACT

The dual axis solar tracker apparatus and method uses an azimuth actuator to adjust the azimuth of an attached solar panel and an elevation actuator to adjust the elevation of a panel seat holding the solar panel to track the azimuth and elevation of the sun as it moves through the sky. The panel seat rotatably supports the solar panel with two pins, and a support structure supports the panel seat with an elevation tracking pivot. The actuators are controlled with an actuator controller circuit that is controlled by a microcontroller. The microcontroller uses information about latitude, longitude, time of day and date to control the actuators and track the motion of sun without the need for sensors.

10 Claims, 13 Drawing Sheets

DUAL AXIS SOLAR TRACKER APPARATUS AND METHOD

BACKGROUND OF THE INVENTION

1. Field of the Invention

The present invention relates to the practical generation of electricity from solar energy, and particularly to a dual axis solar tracker apparatus and method that tracks the movement of the sun to optimize the positioning of solar panels for generating electricity.

2. Description of the Related Art

There is a continuing and increasing interest in the utilization of sunlight for the clean production of electrical energy. Part of the motivation behind this interest is the realization that the sunlight falling on each square meter of Earth is roughly the energy equivalent to 1,000 watts of clean electrical power, depending on location and atmospheric conditions. Currently, the production of electrical energy from sunlight is often accomplished with photovoltaic devices. However, other approaches, such as solar thermal and thermocouple solutions, are being developed as well. At present, all solutions involve relatively expensive hardware so that, in order to compete financially with existing energy generation solutions, there is considerable economic pressure to maximize the efficiency of such solar energy solutions.

One aspect of this desire to maximize the solar energy production efficiency is to orient solar panel surfaces directly towards the sun so the greatest amount of sunlight is available for solar energy production. Various approaches exist for doing this, but they tend to fall into three basic categories. Passive or immobile solar tracking solutions do not move, and rely on other methods to increase sunlight received by a solar panel with lenses and reflectors. Single-axis tracking solutions move the solar panels to track the sun as it moves through the sky each day by adjusting the azimuth, or east-west orientation, of a solar energy solution, such as a photovoltaic solar panel. This results in a considerable improvement over passive solutions that do not track the sun or redirect or concentrate sunlight. However, single-axis tracking solutions ignore the more complex true motion of the sun through the sky that also varies seasonally in accordance with the tilt of the Earth. Because the tilt of the Earth with respect to the plane in which it orbits is approximately 23.44 degrees, the difference between the highest position the sun reaches on the summer solstice and on the winter solstice north or south of the tropics is double the tilt, or 46.88 degrees. Dual-axis solar tracking systems exist to address those issues. However, many dual-axis solar tracking systems rely on sensors to position their solar panels. Other dual-axis solar tracking systems have not been optimized for the forces likely to be encountered in an outside environment to both withstand environmental conditions and to minimize cost.

Thus, a dual axis solar tracker apparatus and method solving the aforementioned problems is desired.

SUMMARY OF THE INVENTION

The dual axis solar tracking apparatus and method uses an azimuth actuator to move a solar panel to track the azimuth of the sun as it moves through the sky each day. The apparatus also uses an elevation actuator to move a panel seat holding the solar panel in order to track the elevation of the sun as it moves through the sky on different paths that vary on a seasonal basis. By having both azimuth and elevation actuators, the position of the sun can be precisely tracked. The actuators are controlled with an actuator controller that is itself controlled by a microcontroller. The microcontroller uses information about latitude, longitude, time of day and date to determine accurate actuator settings to track the motion of sun both throughout the day and throughout the year. In some embodiments, a keypad and display are used to receive latitude, longitude, time of day and date information. The dual axis solar tracking apparatus is designed so that it takes into account the forces likely to be applied to the apparatus and optimizes its designed strength in view of operational safety and cost.

The dual axis solar tracking method uses latitude, longitude, time of day and date to calculate the position of sun to orient an attached solar panel, thus eliminating the need for sensors and their associated costs.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
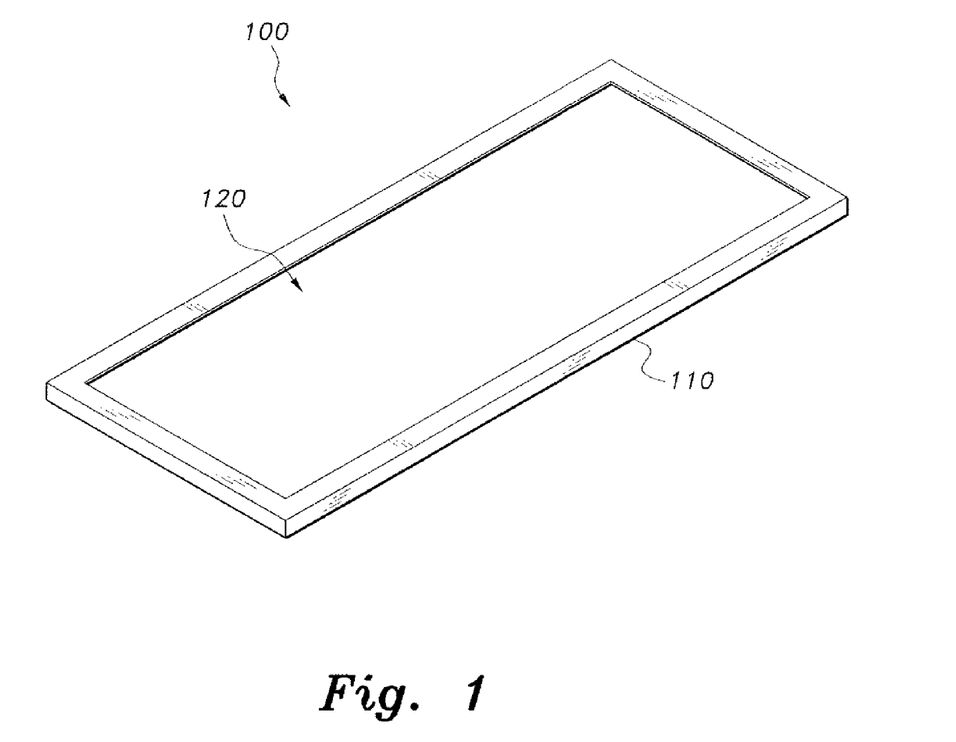
FIG. 1 is a perspective view of a solar panel used in a dual axis solar tracking apparatus and method according to the present invention.

Referring to FIG. 1, there is shown a perspective view of a photovoltaic solar panel frame 100 used in the dual axis solar tracking apparatus and method. The frame 100 is a rectangular frame adapted for receiving a solar panel, the frame 100 being constructed with 38.1 mm angle-bar aluminum 110 having the dimensions of 1200 mm for length, 1650 mm for width and a plate thickness of 1.2 mm. The corresponding weight per unit length is 0.24 grams/millimeter. The frame 100 defines a central area 120 that receives a solar panel, such as those made of amorphous or crystalline silicon, as are known in the art for generating electricity directly from sunlight.

Figure 2:
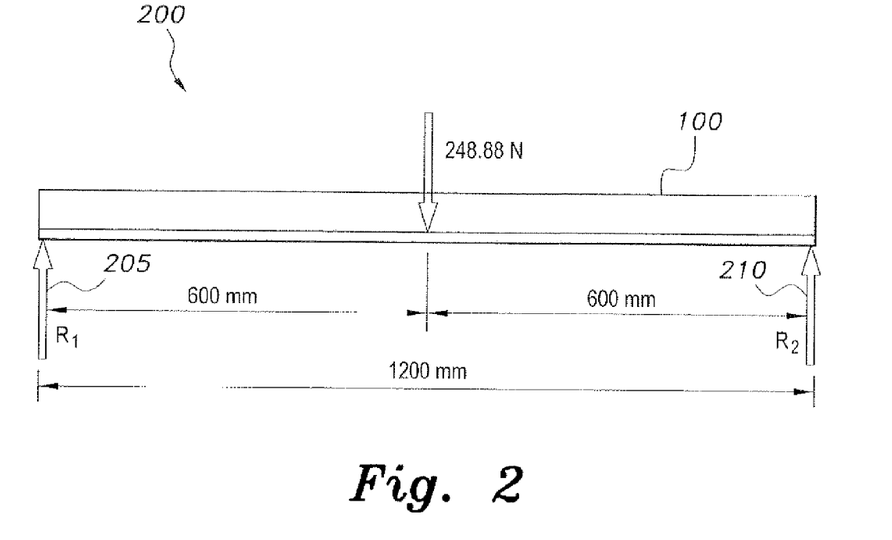
FIG. 2 is a diagrammatic view of a load-balancing model for the photovoltaic solar panel.

Turning to FIG. 2, there is shown a diagrammatic view of a load-balancing model 200 for the solar panel frame 100. The solar panel frame 100, when loaded with a solar panel, is depicted as a load caused by a mass of 25.37 Kilograms (Kg) multiplied by the acceleration due to gravity, i.e., 9.81 m/s$^2$, according to the equation F=ma, which is taken to equal 248.88 Newtons (N). This load of 248.88 N is balanced evenly across support $R_1$ 205 and support $R_2$ 210. Because the load is balanced evenly, half the force (124.44 N) is applied to support $R_1$ 205, and the remaining half of the force (124.44 N) is applied to support $R_2$ 210. The apparatus is engineered to withstand these loads with an extra margin for safety.

Figure 3:
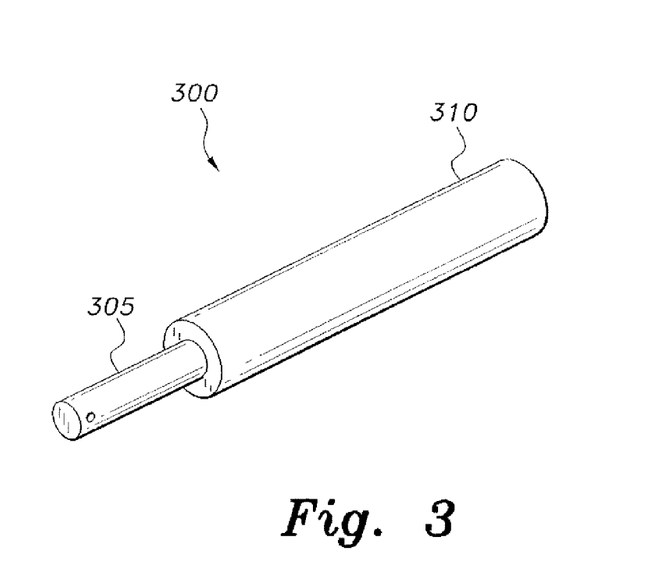
FIG. 3 is a perspective view of a diagrammatic example pin used in a dual axis solar tracking apparatus and method according to the present invention.

Turning to FIG. 3, there is shown an environmental, perspective view of an exemplary pin 300 according to the present invention. The 124.44 N of force derived in FIG. 2 is applied to each of two pins 300. Each of the pins 300 has a narrow portion 305 and a wide portion 310. The narrow portion 300 can be inserted through an aperture with a diameter intermediate of a diameter of the narrow portion 305 and the wide portion 310 to allow insertion of the pin 300, but not so far that it can travel completely through the aperture. As described herein, the weight of the solar panel 100 and panel seat 400 (shown in FIG. 4), rest on two instances of pin 300. For safety measures in view of wind and other environment factors, including forces from actuators, the pins are designed to handle 275 N.

Figure 4:
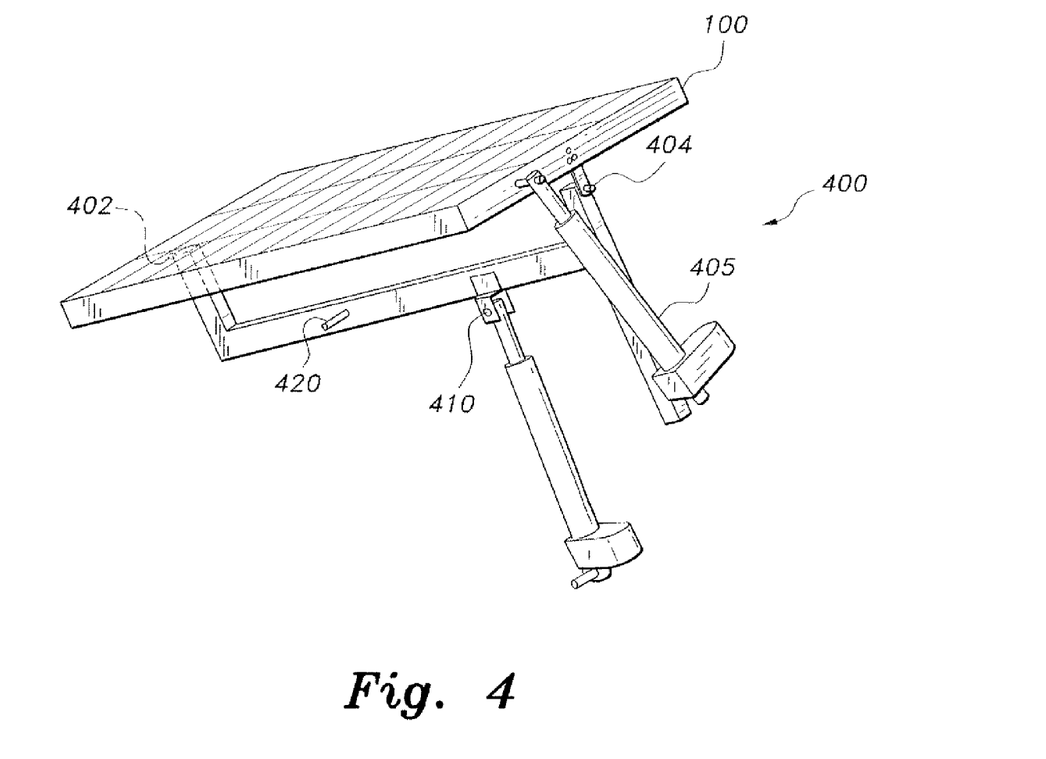
FIG. 4 is a perspective view of a panel seat with attached photovoltaic panel used in a dual axis solar tracking apparatus and method according to the present invention.

Turning to FIG. 4, there is shown an environmental, perspective view of a panel seat 400 with attached frame 100 and solar panel. The panel seat 400 is a generally U-shaped frame having one leg with extended length for attachment of an azimuth actuator 405 thereto. The panel seat 400 is rotationally or pivotally coupled to the frame 100 by a first seat pin 402 and a second seat pin 404, each instances of pin 300. The panel seat 400 includes an azimuth actuator 405 for adjusting the azimuth of the solar panel frame 100 to track the sun as it moves through the sky each day. The azimuth actuator 405 is physically coupled to the solar panel frame 100 at its extensible, distal end and pivotally coupled to the panel seat 400 at its non-extensible, proximal end. Through its extension and retraction, the azimuth actuator 405 positions the solar panel frame 100 so that its vertical axis closely aligns with the position of the sun when the sun is above the horizon. The panel seat 400 also includes an elevation actuator 505 (shown in FIG. 5) for adjusting the elevation of the solar panel frame 100 to track the path of the sun as it changes elevation with the seasons. The elevation actuator 505 is physically connected to an elevation connecting pin 410. The elevation actuator 505 causes the panel seat 400 to rotate about an elevation tracking pivot 420 for adjusting the elevation of the panel seat 400, thereby adjusting the elevation of the attached solar panel frame 100. Both the azimuth actuator 405 and the elevation actuator 505 are electromechanical screw-type linear actuators, but other actuators relying on electromechanical, electromagnetic, electrodynamic, pneumatic, hydraulic or other technologies for inducing controlled motion in the solar panel frame 100 are envisioned and may be used alternatively.

Figure 5:
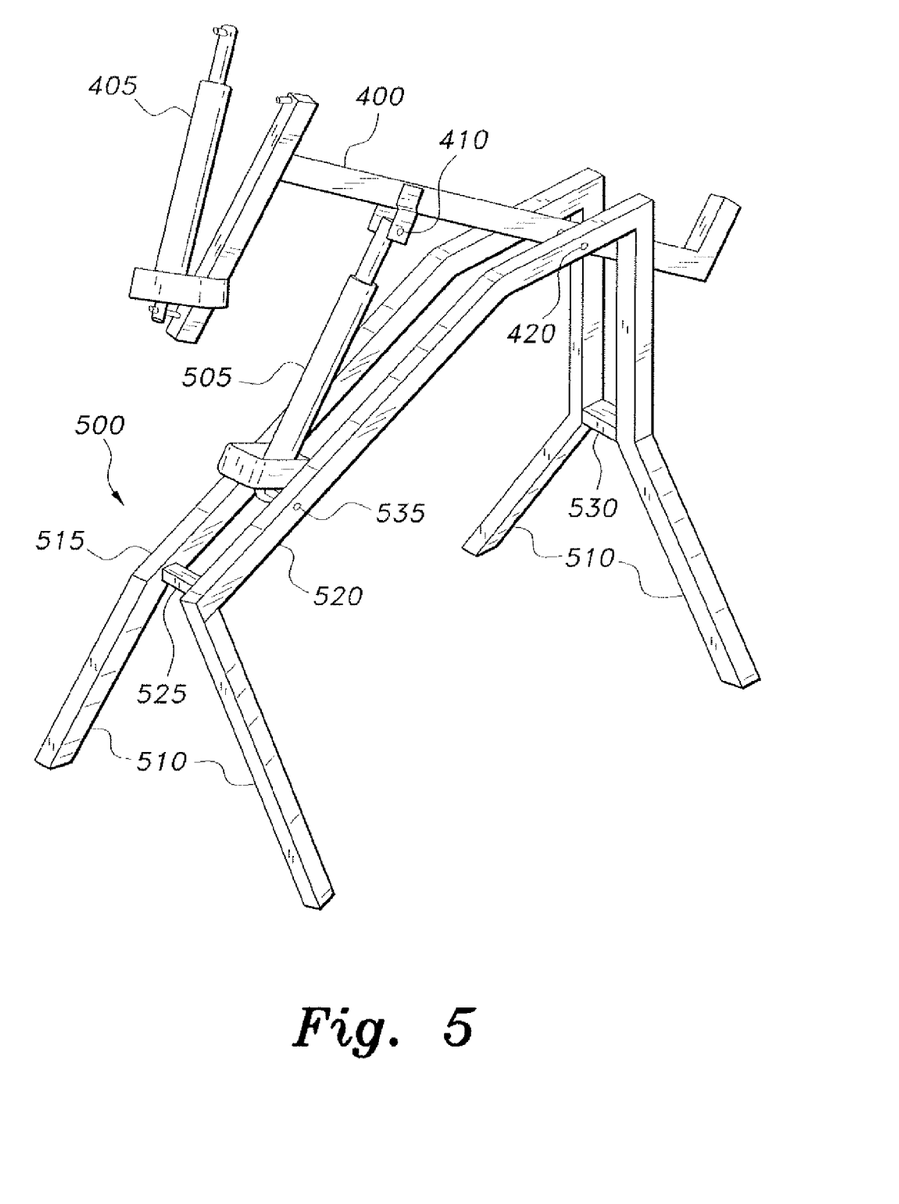
FIG. 5 is a perspective view of the panel seat coupled with a support structure having four legs used in a dual axis solar tracking apparatus and method according to the present invention.

In FIG. 5, there is shown an environmental, perspective view of the panel seat 400 physically coupled to a support structure 500 having four legs 510. An elevation actuator 505 is physically coupled to the panel seat 400 at the elevation actuator's 505 extensible, distal end through the elevation connecting pin 410 and pivotally coupled to the support structure 500 at its non-extensible, proximal end. Two of the four legs 510 are portions of a first angled frame member 515, and the remaining two of the four legs 510 are portions of a second angled frame member 520. The first angled frame member 515 and the second angled frame member 520 are coupled by a first crossbar 525 and a second cross bar 530, respectively, to provide a stable platform and still allow two-axis freedom of movement for the solar panel frame 100. The first angled frame member 515 and the second angled frame member 520 are also coupled by the elevation tracking pivot 420 and an elevation actuator support pin 535. The elevation actuator support pin 535 provides support for the elevation actuator 505 and allows the elevation actuator 505 to rotate freely around the pin 535 as the elevation actuator 505 causes the panel seat 400 to be swept in an arc centered around the elevation tracking pivot 420 in order to track the sun. The dual axis solar tracker apparatus includes the solar panel frame 100 physically coupled to the panel seat 400 and the support structure 500.

Figure 6:
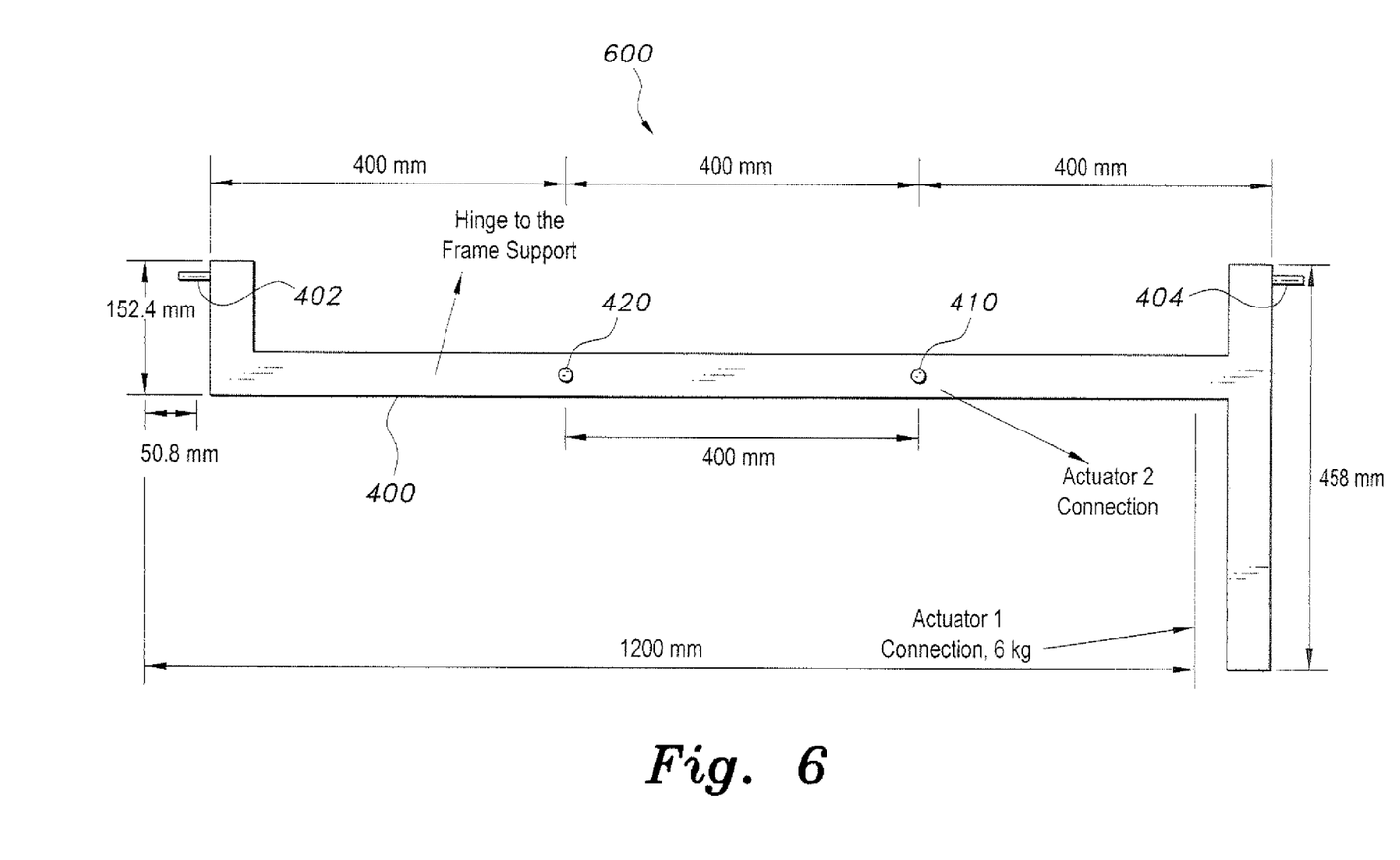
FIG. 6 is a diagrammatic view of a dimensional model for the panel seat used in a dual axis solar tracking apparatus and method according to the present invention.

Turning to FIG. 6, there is shown a diagrammatic view of a dimensional model 600 for the panel seat 400. The panel seat 400 is shown dimensionally so that the total length is 1200 millimeters (mm). The panel seat 400 has the elevation connecting pin 410 positioned 400 mm from one end of the panel seat 400, and 400 mm from the elevation tracking pivot 420. The elevation tracking pivot 420 is positioned 400 mm from the other end of the panel seat 400, as shown. Other dimensions are shown.

Figure 7:
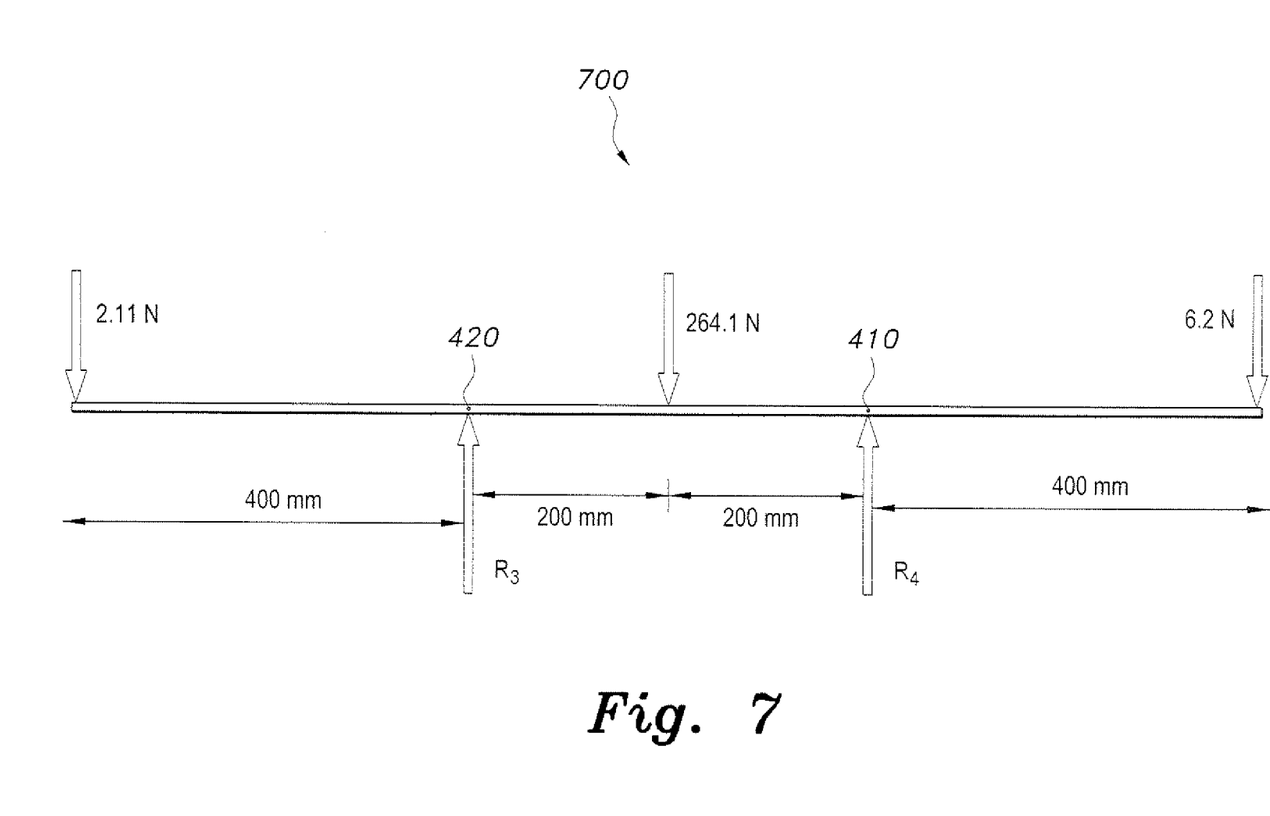
FIG. 7 is a diagrammatic view of a load-balancing model for the panel seat used in a dual axis solar tracking apparatus and method according to the present invention.

FIG. 7 shows a diagrammatic view of a load-balancing model 700 for the panel seat 400. The load-balancing model 700 uses the 1200 mm total length of the panel seat 400 and includes point representations of the elevation connecting pin 410 and the elevation tracking pivot 420. The weight per tube unit length is 1.41 grams/mm, and the total tube length is 152.4 mm+1098.4 mm+458 mm=1,708.8 mm. Thus, the combined force acting on the pins is 2.1 N+264.1 N+6.2 N=272.41 N. The elevation tracking pivot 420 experiences a force of 52,028 Nmm/400 mm=130.07 N, and the elevation connecting pin 410 experiences a force of 272.41N−130.07 N=142.34 N.

Figure 8A:
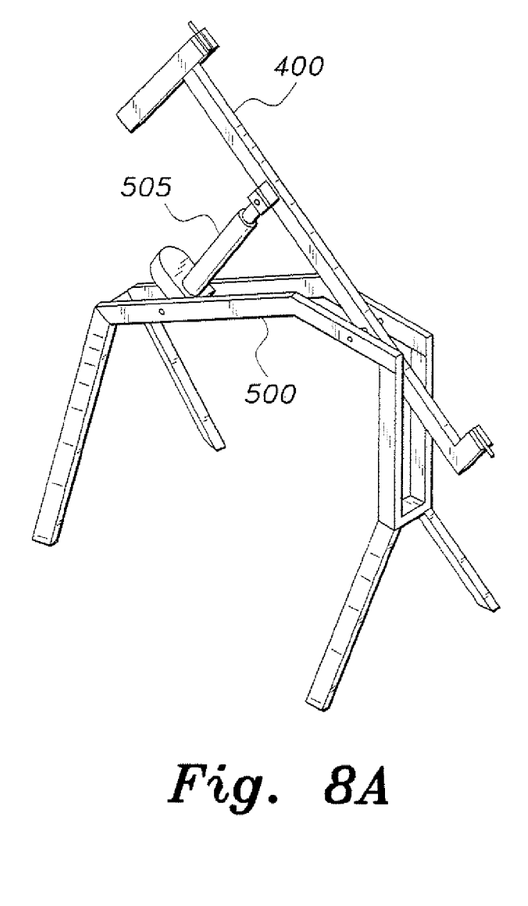
FIG. 8A and FIG. 8B are environmental, perspective views of the panel seat held in different positions by actuators while coupled with the support structure having four legs used in a dual axis solar tracking apparatus and method according to the present invention.
Figure 8B:
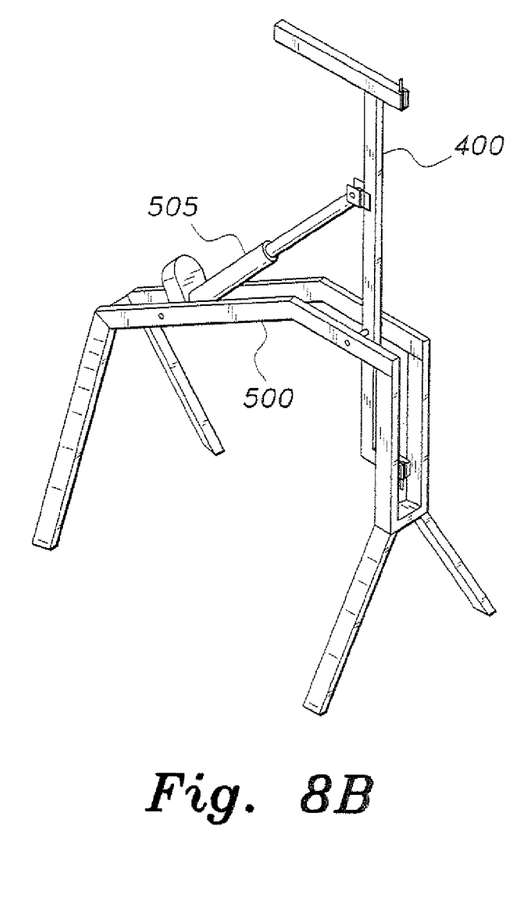

FIGS. 8A and 8B show perspective views of the panel seat 400 held in different positions by actuators 405, 505 while coupled with the support structure 500 having four legs 510. Portions of the dual axis solar tracker apparatus, including the solar panel 100 and azimuth actuator 405, are not shown in FIG. 8A or FIG. 8B to allow the different positioning of the panel seat 400 to be better seen.

FIG. 8A shows the elevation actuator 505 of the dual axis solar tracker apparatus holding the panel seat 400 at approximately a 45° angle with respect to the plane of the surface that the apparatus is resting on. FIG. 8B shows the elevation actuator 505 of the apparatus holding the panel seat 400 at approximately a 90° angle with respect to the plane of the surface that the apparatus is resting on. The apparatus is capable of positioning the panel seat 400, and thus the attached solar panel 100, at any angle from 0° to 90° to allow for two-axis sun tracking and solar energy production at any given latitude on Earth.

Figure 9A:
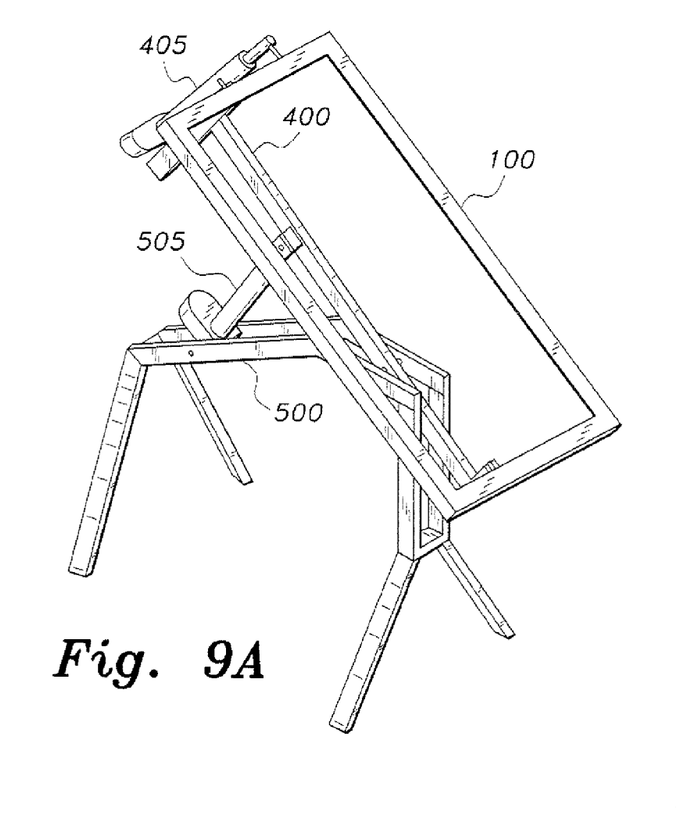
FIG. 9A and FIG. 9B are perspective views of the panel seat holding the photovoltaic panel in different positions by actuators while coupled with the support structure having four legs used in a dual axis solar tracking apparatus and method according to the present invention.
Figure 9B:
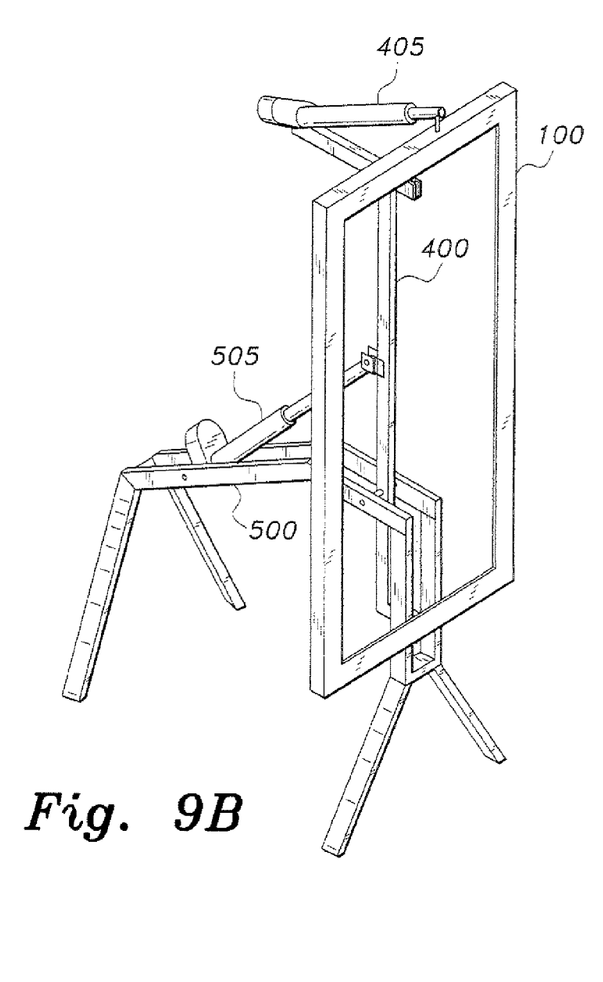

FIGS. 9A and 9B show perspective views of the panel seat 400 held in different positions by actuators 405, 505 while coupled with the support structure 500 having four legs 510. In contrast to the corresponding FIGS. 8A and 8B, FIGS. 9A and 9B include the azimuth actuator 405 and the solar panel 100. The solar panel 100 is shown with the photovoltaic devices 120 removed to allow the structure of the dual axis solar tracker 550 to be better seen. FIG. 9A shows the elevation actuator 505 of the apparatus holding the panel seat 400 at approximately a 45° angle with respect to the plane of the surface that the apparatus is resting on. The azimuth actuator 405 is approximately centered between left- and right-oriented positions, corresponding to local noon, when the sun is at its highest point in the sky for that day. FIG. 9B shows the elevation actuator 505 of the apparatus holding the panel seat 400 at approximately a 90° angle with respect to the plane of the surface that the apparatus is resting on. As in FIG. 9A, the azimuth actuator 405 is approximately centered between left- and right-oriented positions, corresponding to local noon.

Figure 10:
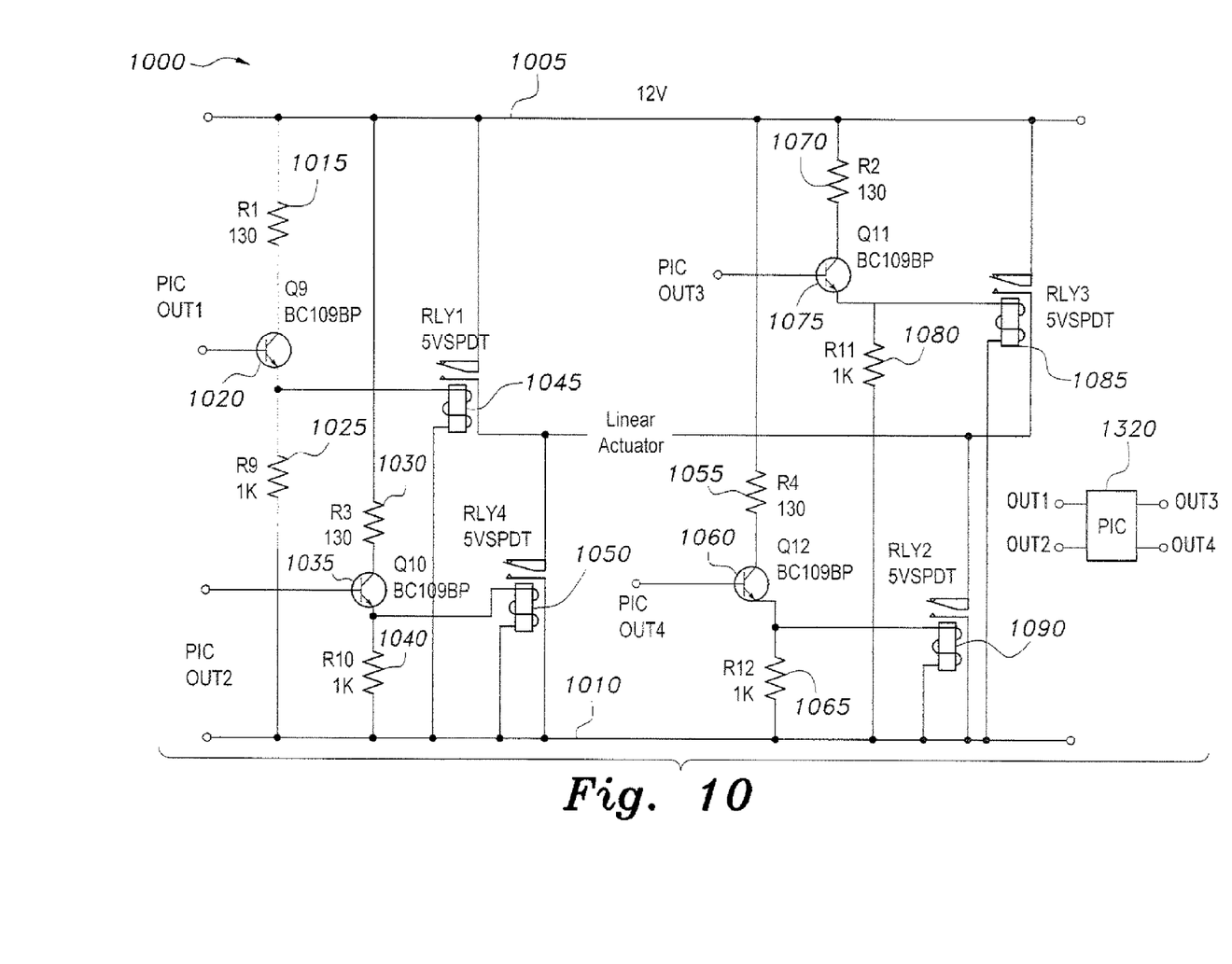
FIG. 10 is a schematic diagram of an actuator control circuit for a linear actuator used in a dual axis solar tracking apparatus and method according to the present invention.

FIG. 10 shows a schematic diagram of an actuator control circuit 1000 for the actuators 405, 505 of the dual axis solar tracker apparatus. The actuator control circuit 1000 is an H-bridge for controlling the direction of current and the motion of the linear actuators 405, 505. Four 5-volt DC relays and four BC 109 n-channel bipolar junction transistors (BJTs) are used as the switching components in combination with eight resistors to form the control circuit 1000. The control circuit 1000 uses a supply voltage 1005 of 12-volts DC and a ground 1010 of 0-volts. Resistors R1 1015 and R9 1025 bias BJT 1020, and a voltage applied by a PIC microcontroller 1320 is applied to the base of BJT 1020 to switch relay RLY1 1045 with voltage taken from the emitter of the BJT 1020. Resistors R3 1030 and R10 1040 bias BJT 1035, and another voltage from the PIC 1320 is applied to the base of BJT 1035 to switch relay RLY4 1050 with voltage taken from the emitter of BJT 1035. RLY4 1050 is in series with RLY1 1045, providing a voltage divider circuit with the voltages taken from the emitters of BJT 1020 and 1035 being applied to relays 1045 and 1050 to control a linear actuator 405, 505, as shown.

Resistors R4 1055 and R12 1025 bias BJT 1060, and another voltage from the PIC 1320 is applied to the base of BJT 1060 to switch RLY2 1090 with voltage taken from the emitter of BJT 1060. Resistors R2 1070 and R11 1080 bias BJT 1075, and another voltage from the PIC 1320 is applied to the base of BJT 1075 to switch RLY3 1085 with voltage taken from the emitter of BJT 1075. Relay RLY3 1085 is connected in series with relay RLY2 1090, forming a voltage divider circuit with the voltages taken from the emitters of BJT 1060 and 1075 being applied to relays 1085 and 1090 to control a linear actuator 405, 505, as shown. In a preferred embodiment, the PIC 1320 is an 18F4620 microcontroller manufactured by Microchip Technology of Chandler, Ariz. Each linear actuator 405, 505 is controlled by a separate actuator control circuit 1000, but the PIC 1320 is common to both actuator control circuits 1000.

The voltages applied by the PIC microcontroller to the BJTs 1020, 1035, 1060, and 1075 turn the BJTs on and off. When the BJT 1020, 1035, 1060, or 1075 is turned on, the coil of the corresponding relay 1045, 1050, 1085, or 1090 is turned on, closing the relay switch and applying 12V to the corresponding linear actuator 405, 505. The relays 1045, 1050, 1085, 1090 are arranged in a bridge circuit to control the direction of the current to extend or retract the linear actuator 405, 505, as desired. When BJT 1020 and BJT 1060 are turned on, the linear actuator extends forward. When BJT 1035 and BJT 1075 are turned on, the linear actuator retracts to reverse direction. When BJT 1020 and BJT 1075 are turned on, or when BJT 1035 and BJT 1060 are turned on, the linear actuator stops.

Figure 11:
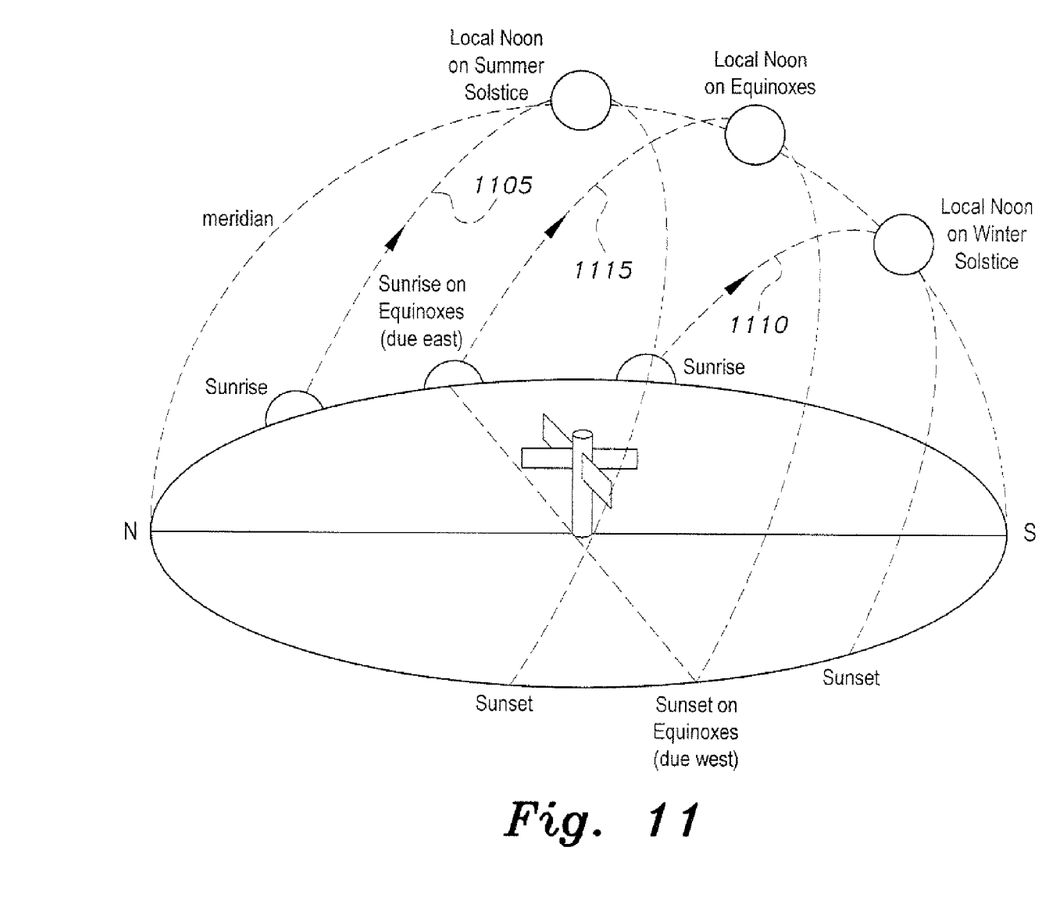
FIG. 11 is a diagrammatic view of selected motion tracks of the sun throughout the year.

FIG. 11 shows a diagrammatic view of selected motion tracks of the sun 1100 throughout the year. From a latitude of approximately 23.44 degrees north, i.e., just on the northern edge of the tropical zone, there are three different sun tracks in a polar-type coordinate system. A summer solstice sun track 1105 is shown with sunrise and sunset both occurring north of due east and due west, respectively. A winter solstice sun track 1110 is shown with sunrise and sunset both occurring south of due east and due west, respectively. Finally, the spring and fall equinox sun tracks 1115 (taken to be the same for illustration purposes) are shown with a sunrise being due east and a sunset being due west on those days. As one can see from FIG. 11, the sun takes a different path through the sky depending on the time of year. The exact path also depends on the latitude.

Figure 12:
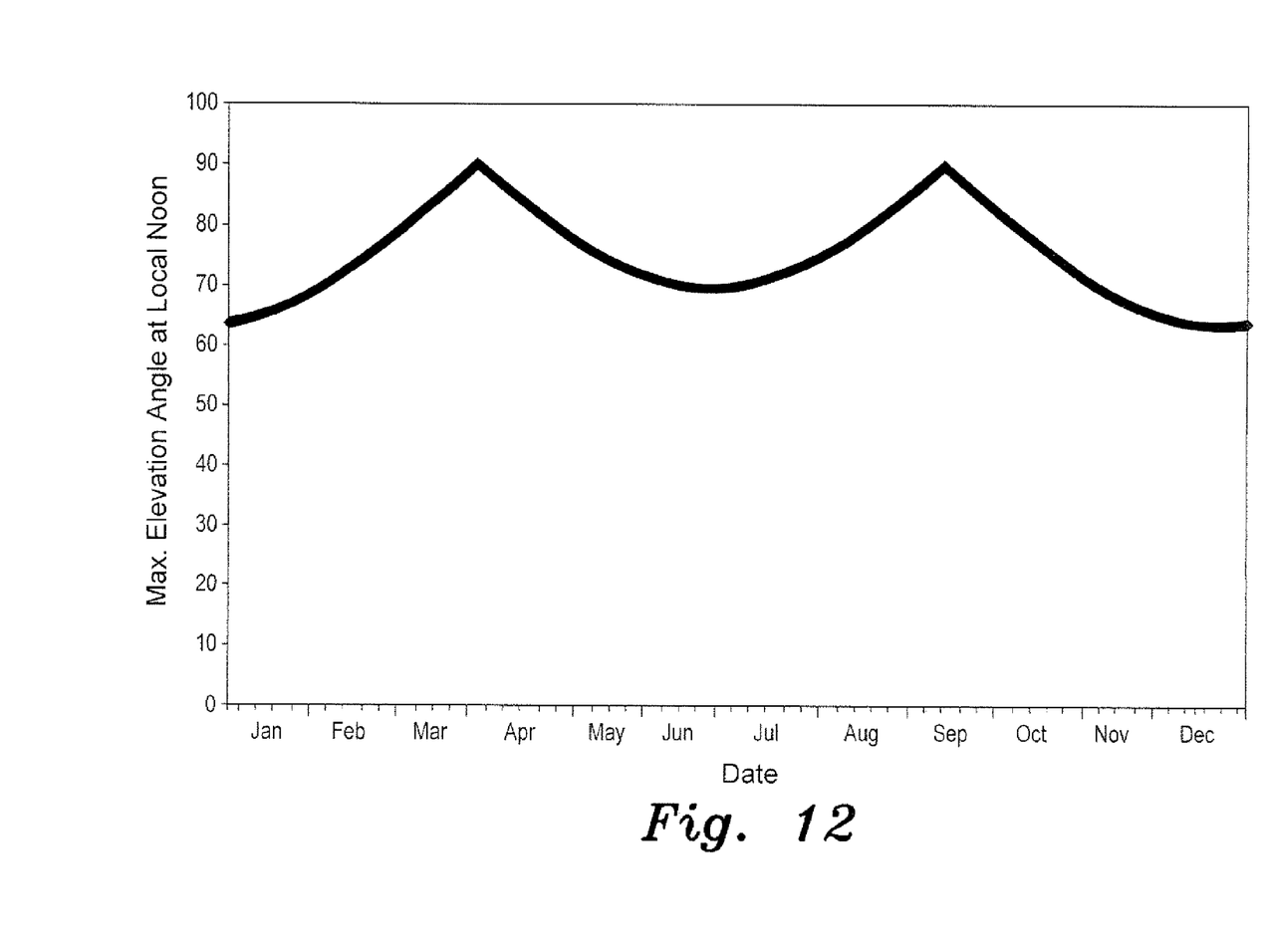
FIG. 12 is a chart showing the maximum elevation angle of the sun throughout the year.

FIG. 12 shows a chart of the elevation angle at noon throughout the year according to the motion of the sun. The chart is plotted for the city of Kuala Lumpur, Malaysia, which is located a few degrees north of the equator in the tropical zone. During two different days per year, the sun is nearly directly overhead as it continues its northward or southward progression during the winter and summer solstices, respectively. FIG. 12 illustrates the continual variation of the sun's path through the sky during the year at a given location. Information regarding latitude, longitude, time of day and date are used by the PIC microcontroller 1320 for the elevation actuator 505 to enable the dual-axis solar tracker 550 to accurately follow the sun throughout the year as its path varies.

Figure 13:
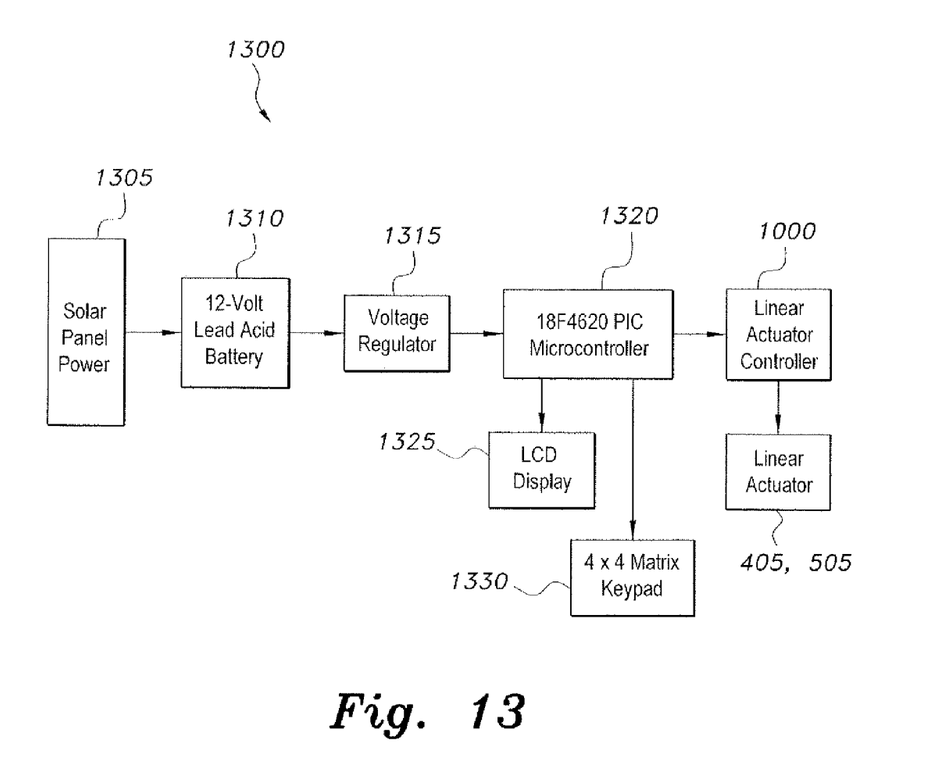
FIG. 13 is a block diagram of circuits used in a dual axis solar tracking apparatus and method according to the present invention.
Figure 14:
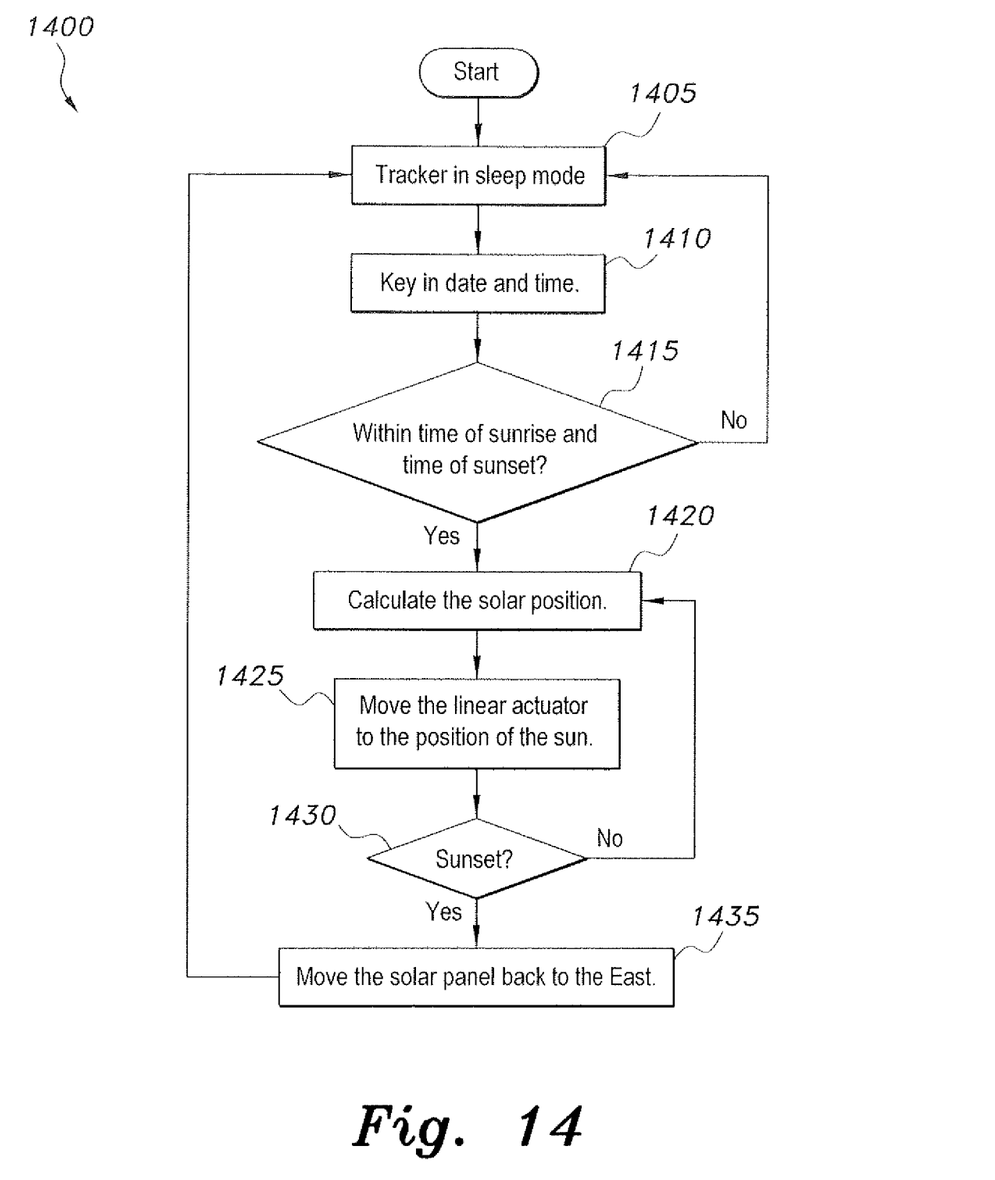
FIG. 14 is a flowchart for positioning the solar panel using a dual axis solar tracking apparatus and method according to the present invention.

Turning to FIG. 13, there is shown a block diagram of the circuit of the dual axis solar tracker apparatus. The circuit 1300 begins with solar panel electrical power 1305 generated by the solar panel 100. The solar panel electrical power 1305 is used to charge a 12-volt battery 1310. The battery 1310 may be a standard lead-acid car battery. Electrical power from the battery 1310 drives a voltage regulator 1315 to provide power for the PIC microcontroller 1320. The microcontroller 1320 is electrically coupled to a liquid crystal display (LCD) type display 1325 and a 4×4 matrix keypad 1330 for exchanging information with a user, such as solicitation and confirmation information regarding latitude, longitude, time of day and date. The PIC microcontroller 1320 is programmed to calculate the azimuth and elevation data for each day of the year for the particular location where the tracker apparatus is positioned (given the date, time, latitude and longitude), so that the actuator circuit(s) 1000 can control the solar panel 100 to accurately track the sun. Alternatively, the latitude and longitude can be received through wireless communications, or derived instead from a global positioning signal (GPS) device. Similarly, time of day and date can be received through wireless communications or derived from a suitable timekeeping device. The microcontroller 1320 controls the actuator controller(s) 1000 that drives the linear actuators 405, 505, as described above, FIG. 14 shows a flowchart 1400 for positioning the solar panel according to the present invention. In step 1405, the dual axis solar tracker apparatus starts with the microcontroller 1320 in sleep mode, or in initial installation. In step 1410 a user enters the date and time. If this is the initial installation the longitude and latitude must also be entered. In step 1415 the microcontroller 1320 calculates whether it is presently during the daylight hours, i.e., between sunrise and sunset. If not, the microcontroller 1320 returns to step 1405, but if it is presently during the daylight hours, the microcontroller 1320 proceeds to step 1420 and calculates the position of the sun based on date, time, longitude and latitude. Once the position of the sun is determined in step 1420, then in step 1425 the microcontroller causes the actuators 405, 505 to align the vertical axis of the solar panel 100 with the position of the sun, i.e., the actuators 405, 505 move the solar panel 100 so it is directly facing the sun and continues to track the sun at it moves through the sky. In step 1430 the microcontroller 1320 queries whether the sun has effectively set and solar power generation has effectively ceased. If the sun has not set, the microcontroller proceeds back to step 1420, but if the sun has set, the microcontroller 1320 proceeds to step 1435 and moves the solar panel back to an eastward-facing direction in anticipation of sunrise the following day. The eastward-facing direction can be based on a calculation of the expected position of sunrise the next day.

It is to be understood that the present invention is not limited to the embodiments described above, but encompasses any and all embodiments within the scope of the following claims.

We claim:

1. A dual axis solar tracker apparatus, comprising:
   a rectangular panel frame adapted for attachment of a solar panel thereto;
   a panel seat, the panel seat being a U-shaped frame having a pair of upright legs and a connecting leg with extended length therebetween, the panel seat having two pins extending therefrom, the panel frame being pivotally attached to the two pins on the panel seat to allow an azimuth of the panel frame to be varied;
   an azimuth actuator, the azimuth actuator being a linear actuator having a non-extensible proximal end and an extensible distal end, the azimuth actuator being pivotally connected to one of the upright legs of the panel seat at the non-extensible proximal end and pivotally connected to the panel frame at the extensible distal end;
   a support structure, the support structure having a first angled frame member and a second angled frame member, the support structure having at least one crossbar connecting the first angled frame member to the second angled frame member, the support structure having an elevation actuator support pin and an elevation tracking pivot, wherein the support pin and tracking pivot are spaced apart from each other, the panel seat being pivotally connected directly to the support structure at the elevation tracking pivot to allow the elevation of the panel seat to be varied;
   an elevation actuator, the elevation actuator being a linear actuator having a non-extensible proximal end and an extensible distal end, the elevation actuator being pivotally connected directly to the support structure at the elevation actuator support pin and at the non-extensible proximal end and pivotally connected to the connecting leg of the panel seat at the extensible distal end;
   an actuator control circuit, the actuator control circuit being electrically coupled to the azimuth actuator and to the elevation actuator to control activation of the azimuth actuator and the elevation actuator; and
   a microcontroller, the microcontroller being configured for calculating the current position of the sun using data representing longitude, latitude, date and time associated with location of the dual axis solar tracker apparatus, the microcontroller being electrically coupled to the actuator control circuit to control activation of the actuator control circuit and indirectly controlling activation of the azimuth actuator and elevation actuator to position the solar panel for maximum exposure to the sun.

2. The dual axis solar tracker apparatus according to claim 1, further comprising a keypad, the keypad electrically coupled to the microcontroller for programming the longitude, latitude, date, and time of the apparatus location into the microcontroller.

3. The dual axis solar tracker apparatus according to claim 2, further comprising an LCD display connected to said microcontroller, the LCD display displaying visual information corresponding to latitude, longitude, time of day and date.

4. The dual axis solar tracker apparatus according to claim 3, wherein the LCD is configured to display solicitation and confirmation information to a user corresponding to latitude, longitude, time of day and date.

5. The dual axis solar tracker according to claim 1, wherein said actuator control circuit comprises an H-bridge of relays alternately switched on and off in combinations adapted to extend and retract the azimuth and elevation linear retractors in response to voltages generated by said microcontroller according to the microcontroller-calculated azimuth and elevation of the sun, given the longitude, latitude, date and time where the tracker apparatus is located.

6. The dual axis solar tracker according to claim 1, wherein the at least one crossbar comprises a plurality of crossbars.

7. The dual axis solar tracker according to claim 1, wherein the two pins are each capable of supporting a force of approximately 124.44 N.

8. A method for controlling a dual axis solar tracker having a solar panel mounted thereon, comprising the steps of:
   providing the dual axis solar tracker apparatus as provided in claim 1;
   determining if the current time is both after sunrise and before sunset of one day at a known longitude, latitude and date;
   calculating a current position for the sun and corresponding azimuth actuator and elevation actuator positions;
   moving the solar panel to track the actual position of the sun so that a vertical axis of the solar panel is substantially aligned to the current position of the sun;
   determining whether sunset has occurred; and
   moving the solar panel to an east-facing position if sunset has occurred.

9. The method for controlling a dual axis solar tracker according to claim 8, wherein the step of moving the solar panel to an east-facing position moves the solar panel into alignment with an expected position for the next sunrise.

10. The method for controlling a dual axis solar tracker according to claim 8, further comprising the step of receiving electronic information corresponding to longitude, latitude, date and time.

* * * * *